United States Patent
Wang et al.

(10) Patent No.: US 12,453,345 B2
(45) Date of Patent: Oct. 28, 2025

(54) SERUM-FREE CRYOPRESERVATION SOLUTION AND PREPARATION METHOD AND APPLICATION THEREOF

(71) Applicants: INSTITUTE OF CHEMISTRY, CHINESE ACADEMY OF SCIENCES, Beijing (CN); PEKING UNIVERSITY THIRD HOSPITAL, Beijing (CN)

(72) Inventors: Jianjun Wang, Beijing (CN); Shenglin Jin, Beijing (CN); Jianyong Lv, Beijing (CN); Jie Yan, Beijing (CN); Jie Qiao, Beijing (CN); Liying Yan, Beijing (CN); Rong Li, Beijing (CN)

(73) Assignees: INSTITUTE OF CHEMISTRY, CHINESE ACADEMIC OF SCIENCES, Beijing (CN); PEKING UNIVERSITY THIRD HOSPITAL, Beijing (CN)

( * ) Notice: Subject to any disclaimer, the term of this patent is extended or adjusted under 35 U.S.C. 154(b) by 1047 days.

(21) Appl. No.: 17/600,987

(22) PCT Filed: Mar. 2, 2020

(86) PCT No.: PCT/CN2020/077474
§ 371 (c)(1),
(2) Date: Oct. 1, 2021

(87) PCT Pub. No.: WO2020/207152
PCT Pub. Date: Oct. 15, 2020

(65) Prior Publication Data
US 2022/0142148 A1    May 12, 2022

(30) Foreign Application Priority Data

Apr. 9, 2019  (CN) .......................... 201910281978.2
Apr. 9, 2019  (CN) .......................... 201910281986.7

(Continued)

(51) Int. Cl.
*A01N 1/125* (2025.01)
*C12N 5/071* (2010.01)
(Continued)

(52) U.S. Cl.
CPC ........... *A01N 1/125* (2025.01); *C12N 5/0604* (2013.01); *C12N 5/0609* (2013.01); *C12N 5/0665* (2013.01); *C12N 5/0682* (2013.01)

(58) Field of Classification Search
CPC .. A01N 1/0221; C12N 5/0604; C12N 5/0609; C12N 5/0665; C12N 5/0682
See application file for complete search history.

(56) References Cited

U.S. PATENT DOCUMENTS 6,395,467 B1 * 5/2002 Fahy .................. C09K 3/18
                                                  435/1.3

FOREIGN PATENT DOCUMENTS

| CN | 1748709 A | 3/2006 |
| CN | 101250499 A | 8/2008 |

(Continued)

OTHER PUBLICATIONS

Deller (Deller, R., Vatish, M., Mitchell, D. et al. Synthetic polymers enable non-vitreous cellular cryopreservation by reducing ice crystal growth during thawing. Nat Commun 5, 3244 (2014). https://doi.org/10.1038/ncomms4244). (Year: 2014).*

(Continued)

*Primary Examiner* — Tracy Vivlemore
*Assistant Examiner* — Thomas R. Amick
(74) *Attorney, Agent, or Firm* — Nkl Law; Allen Xue (57) ABSTRACT

A serum-free cryopreservation solution contains a biomimetic ice control material, a polyol, a water-soluble sugar, and a buffer solution margin. The bionic ice control material can be polyvinyl alcohol or an amino acid compound. The cryopreservation liquid of the present invention uses the bionic ice control material as the main component, does not contain serum, has low toxicity, and can achieve a cell survival rate that is the same as, or higher than, existing cryopreservation solutions.

11 Claims, 3 Drawing Sheets

(30) Foreign Application Priority Data

Apr. 9, 2019 (CN) .................. 201910282416.X
Apr. 9, 2019 (CN) .................. 201910282417.4

(51) Int. Cl.
*C12N 5/073* (2010.01)
*C12N 5/075* (2010.01)
*C12N 5/0775* (2010.01)

(56) References Cited

FOREIGN PATENT DOCUMENTS

| | | | | | |
|---|---|---|---|---|---|
| CN | 104585165 | A | | 5/2015 | |
| CN | 104839144 | A | | 8/2015 | |
| CN | 108207930 | A | * | 6/2018 | ........... A01N 1/0221 |
| CN | 109221082 | A | | 1/2019 | |
| WO | 9110361 | A1 | | 7/1991 | |

OTHER PUBLICATIONS

Wowk 2000 (Wowk, Brian, et al. "Vitrification enhancement by synthetic ice blocking agents." Cryobiology 40.3 (2000): 228-236.) (Year: 2000).*

Wowk 2005 (Wowk, Brian. "Anomalous high activity of a subfraction of polyvinyl alcohol ice blocker." Cryobiology 50.3 (2005): 325-331.) (Year: 2005).*

Winterton (Winterton, R. H. S. (1970). Van der Waals forces. Contemporary Physics, 11(6), 559-574. https://doi.org/10.1080/00107517008202194) (Year: 1970).*

Urbanczyk (Urbańczyk, M., Góra, J., Latajka, R. et al. Antifreeze glycopeptides: from structure and activity studies to current approaches in chemical synthesis. Amino Acids 49, 209-222 (2017)) (Year: 2017).*

Balcerzak (Balcerzak, Anna K., et al. "Designing ice recrystallization inhibitors: from antifreeze (glyco) proteins to small molecules." RSC Advances 4.80 (2014): 42682-42696.) (Year: 2014).*

Graham (Graham, Ben et al. "Polyproline as a Minimal Antifreeze Protein Mimic That Enhances the Cryopreservation of Cell Monolayers." Angewandte Chemie (International ed. in English) vol. 56,50 (2017): 15941-15944.) (Year: 2017).*

Lynch, Paul T. et al.; Effects of Osmotic Pretreatments on Oxidative Stress, Antioxidant Profiles and Cryopreservation of Olive Somatic Embryos, Plant Science, vol. 181, No. 1, Apr. 1, 2011, ISSN: 0168-9452, p. 48, left column, the last but 12 line to the last but 10 line.

Huang, Fengling et al.; Quick Freezing of Bovine IVF Embryos, Journal of Guangxi Agricultural University, vol. 13, No. 1, Mar. 30, 1994, ISSN: 1005-201, the abstract.

* cited by examiner

SERUM-FREE CRYOPRESERVATION SOLUTION AND PREPARATION METHOD AND APPLICATION THEREOF

CROSS-REFERENCE TO RELATED APPLICATIONS

The present application is a U.S. national entry of PCT international application No. PCT/CN2020/077474, which claims priority to Chinese Patent Application Nos. 201910282417.4, 201910282416.X, 201910281986.7 and 201910281978.2 filed with the China National Intellectual Property Administration on Apr. 9, 2019, which are incorporated herein by reference in their entirety.

TECHNICAL FIELD

The present invention relates to the technical field of biomedical materials, and particularly to a serum-free cryopreservation solution and a preparation method and use thereof.

BACKGROUND

Cryopreservation is to store a biological material at an ultra-low temperature to slow down or stop cell metabolism and division, and to continue development once normal physiological temperature is recovered. Since its advent, this technology has become one of indispensable research methods in the field of natural science, and has been widely adopted. In recent years, with the increasing pressure of life, human fertility tends to decline year by year, and thus fertility preservation is more and more emphasized. The cryopreservation of human germ cells (sperms and oocytes), gonad tissues and the like has become an important means of fertility preservation. In addition, as the world population ages, the need for cryopreservation of donated human cells, tissues or organs that can be used for regenerative medicine and organ transplantation is growing fast. Therefore, how to efficiently cryopreserve precious cells, tissues and organ resources for future needs has become a scientific and technical problem to be solved urgently.

Currently, the most commonly available cryopreservation method is vitrification. Although the vitrification technology can allow liquid inside and outside a cell to be directly vitrified in the rapid freezing process so as to avoid the damage resulting from the formation of ice crystals in the freezing process, cryopreservation reagents of the prior art are not effective in controlling the growth and recrystallization of the ice crystals in the thawing process and thus damage the cell. In addition, current cryopreservation solutions generally comprises serum, which serves as a nutrient ingredient and plays a role in protecting embryos. But serum is derived from organisms and is prone to carry viruses or has immunogenicity, which leads to toxic and side effects of cryopreservation reagents on cells and has serious impacts on the post-thaw survival rate and even the safety (of offspring) and function expression of cryopreserved objects. In conclusion, the currently used cryopreservation reagents have the problems of having no capability of effectively controlling the growth and recrystallization of ice crystals in the thawing process and being high in toxicity.

SUMMARY

The present invention provides a serum-free cryopreservation solution, which avoids the biological safety problem caused by serum, can achieve a good cryopreservation effect, and is good in biocompatibility.

The present invention provides the following technical solutions:

a serum-free cryopreservation solution comprising, per 100 mL, 0.01-50.0 g of a biomimetic ice growth inhibition material, 5.0-45 mL of a polyalcohol, a water-soluble saccharide at 0.1-1 mol $L^{-1}$, 0-15 mL of DMSO and the balance of a buffer, wherein the biomimetic ice growth inhibition material is selected from one of or a combination of a PVA and an amino acid biomimetic ice growth inhibition material.

According to the present invention, the cryopreservation solution is free of serum or a substitute thereof, for example is free of human serum albumin or a substitute thereof, such as sodium dodecyl sulphate (SDS), and also is free of fetal bovine serum or bovine serum albumin.

According to the present invention, the amino acid biomimetic ice growth inhibition material is selected from one or two or more of a polyamino acid (with a degree of polymerization ≥2, preferably 2-40, such as 6, 8, 15 or 20 etc.), an amino acid and a peptidic compound.

According to the present invention, the peptidic compound is a polypeptide (preferably a peptide consisting of 2 to 8 different amino acids, such as a dipeptide, a tripeptide or a tetrapeptide), a glycopeptide derivative, or a compound of formula (I):

formula (I)

wherein R is selected from substituted or unsubstituted alkyl, and the substituent may be selected from —OH, —NH$_2$, —COOH, —CONH$_2$ and the like; for example, R is substituted or unsubstituted $C_{1-6}$ alkyl, and preferably R is —CH$_3$, —CH$_2$CH$_3$ or —CH$_2$CH$_2$COOH; n is an integer greater than or equal to 1 and less than or equal to 1000, and, for example, may be an integer ranging from 1 to 100. In some embodiments of the present invention, n is an integer such as 2, 3, 4, 5, 6, 7, 8, 9 and 10.

According to the present invention, the polyalcohol may be C2-5 polyalcohol, preferably C2-C3 dihydric alcohol and trihydric alcohol, and for example, any one of ethylene glycol, propylene glycol and glycerol.

According to the present invention, the water-soluble saccharide may be at least one of a non-reducing disaccharide, a water-soluble polysaccharide (e.g., a water-soluble cellulose) and a glycoside, for example, selected from sucrose, trehalose, polysucrose and hydroxypropyl methyl cellulose. The water-soluble saccharide can protect cell membranes and prevent cell from sedimentation.

According to the present invention, the buffer may be at least one of DPBS, hepes-buffered HTF buffer and other cell buffers.

According to the cryopreservation solution disclosed herein, the biomimetic ice growth inhibition material may be a PVA, and the content of the PVA is 0.1-6.0 g, such as 0.5-5.0 g, and specifically, may be 1.0 g, 2.0 g, 3.0 g or 4.0 g.

According to the cryopreservation solution disclosed herein, the biomimetic ice growth inhibition material may be a polyamino acid or an amino acid, and the content of the polyamino acid or amino acid is 0.01-50 g, such as 1.5-50 g, and specifically, may be 8.0 g, 10 g, 15 g, 20 g, 30 g or 40 g.

According to the cryopreservation solution disclosed herein, the ice growth inhibition material may be a combination of a PVA and a polyamino acid, for example consists of 0.1-5.0 g of the PVA and 1.0-9.0 g of the polyamino acid.

According to the cryopreservation solution disclosed herein, the ice growth inhibition material may be a combination of a PVA and an amino acid, for example consists of 0.1-5.0 g of the PVA and 8.0-35 g of the amino acid.

According to the cryopreservation solution disclosed herein, the content of the polyalcohol is 6.0-28 mL, such as 7.0-20 mL or 10-15 mL, per 100 mL of the cryopreservation solution.

According to the cryopreservation solution disclosed herein, the content of the water-soluble saccharide is 0.1-1.0 mol $L^{-1}$ per 100 mL of the cryopreservation solution, such as 0.1-0.8 mol $L^{-1}$ or 0.2-0.6 mol $L^{-1}$, and specifically, such as 0.25 mol $L^{-1}$, 0.5 mol $L^{-1}$, or 1.0 mol $L^{-1}$.

According to the cryopreservation solution disclosed herein, the pH of the cryopreservation solution is 6.5-7.6, such as 6.9-7.2.

As an embodiment of the present invention, the cryopreservation solution comprises, per 100 mL, 0.1-50 g of an amino acid biomimetic ice growth inhibition material, 5.0-45 mL of a polyalcohol, 0-15 mL of DMSO, a water-soluble saccharide at 0.1-1 mol $L^{-1}$ and the balance of a buffer.

As an embodiment of the present invention, the cryopreservation solution comprises, per 100 mL in volume, 0.01-6.0 g of a PVA, 5.0-45 mL of a polyalcohol, a water-soluble saccharide at 0.1-1.0 mol $L^{-1}$, 0-15 mL of DMSO, and the balance of a buffer.

As an embodiment of the present invention, the cryopreservation solution comprises 0.1-50 g of the peptidic compound, 0-6.0 g of a PVA, 0-9.0 g of a polyamino acid, 0-15 mL of DMSO, 5-45 mL of a polyalcohol, a water-soluble saccharide at 0.1-1.0 mol $L^{-1}$, and the balance of a buffer.

As an embodiment of the present invention, the cryopreservation solution comprises, per 100 mL in volume, 0.1-50 g of the peptidic compound, 0.1-6.0 g of a PVA, 0-9.0 g of a polyamino acid, 0-15 mL of DMSO, 5.0-45 mL of a polyalcohol, a water-soluble saccharide at 0.1-1.0 mol $L^{-1}$, and the balance of a buffer.

As an embodiment of the present invention, the cryopreservation solution comprises, per 100 mL in volume, 0.1-50 g of the peptidic compound, 0.1-6.0 g of a PVA, 0.1-9.0 g of a polyamino acid, 0.1-mL of DMSO, 5.0-45 mL of a polyalcohol, a water-soluble saccharide at 0.1-1.0 mol $L^{-1}$, and the balance of a buffer.

As an embodiment of the present invention, the cryopreservation solution consists of the following components per 100 mL in volume:
0.1-6.0 g of a PVA,
10-45 mL of a polyalcohol,
a water-soluble saccharide at 0.2-1.0 mol $L^{-1}$, and
the balance of a buffer.

Preferably, the cryopreservation solution consists of the following components per 100 mL in volume:
1.0-5.0 g of a PVA,
5.0-20 mL of ethylene glycol,
sucrose at 0.2-0.6 mol $L^{-1}$, and
the balance of DPBS.

As an embodiment of the present invention, the cryopreservation solution consists of the following components per 100 mL in volume:
0.1-9.0 g of a polyamino acid,
0.01-6.0 g of a PVA,
10-30 mL of a polyalcohol,
a water-soluble saccharide at 0.1-1.0 mol $L^{-1}$, and
the balance of a buffer.

Preferably, the cryopreservation solution consists of the following components per 100 mL in volume:
0.1-5.0 g of polyproline or polyarginine,
1.0-6.0 g of a PVA,
10-20 mL of ethylene glycol,
sucrose at 0.2-0.8 mol $L^{-1}$, and
the balance of DPBS.

The present invention also provides a preparation method of the cryopreservation solution, which comprises the following steps: dissolving a biomimetic ice growth inhibition material in DPBS, adjusting the pH after cooling to room temperature, dissolving other components in the rest DPBS and mixing after cooling, and confirming or adjusting the pH again and making up to a predetermined volume with the buffer.

The preparation method according to the present invention comprises the following steps:
(1) dissolving a PVA in a portion of a buffer and adjusting pH after cooling to room temperature to give a solution 1; (2) optionally, dissolving a polyamino acid or an amino acid in a portion of the buffer and adjusting the pH after cooling to room temperature to form a solution 2; (3) dissolving a water-soluble saccharide in another portion of the buffer and adding other components after the water-soluble saccharide is completely dissolved to prepare a solution 3; and (4) mixing the solution 1, optionally the solution 2 and the solution 3 after they are cooled to room temperature, and adjusting the pH and making up to a predetermined volume with the buffer to give the cryopreservation solution.

According to the preparation method disclosed herein, in the step (1), the PVA is dissolved by heating in a warm bath, such as heating in an oil bath or a water bath. For example, the temperature of the water bath is 60-95° C., preferably 80° C. In the step (1), the dissolving comprises a stirring step.

According to the preparation method disclosed herein, in the step (2), the dissolving is ultrasound-assisted dissolving.

Provided is a serum-free freezing equilibration solution comprising, per 100 mL in volume, 0-5.0 g of a PVA, 5.0-45 mL of a polyalcohol and the balance of a buffer.

According to the freezing equilibration solution disclosed herein, the content of the PVA is 0.1-5.0 g, such as 0.1 g, 0.5 g, 1.0 g or 2.0 g.

According to the freezing equilibration solution disclosed herein, the content of the polyalcohol is 6.0-28 mL, such as 7.0-20 mL or 10-15 mL.

As an embodiment of the present invention, the freezing equilibration solution comprises, per 100 mL in volume, 7.5-15 mL of a polyalcohol and the balance of DPBS.

As an embodiment of the present application, the freezing equilibration solution comprises, per 100 mL in volume, 1.0-5.0 g of a PVA, 7.5-15 mL of a polyalcohol and the balance of a buffer.

In the freezing equilibration solution disclosed herein, the PVA and the polyalcohol may be selected from the types of the respective components of the cryopreservation solution.

The present invention also provides a preparation method of the freezing equilibration solution, which comprises dissolving all components in a buffer.

Provided is a serum-free cryopreservation reagent comprising the freezing equilibration solution described above and the cryopreservation solution described above, wherein the freezing equilibration solution and the cryopreservation solution are present independently of each other.

According to the cryopreservation reagent disclosed herein, the content of serum in the cryopreservation solution is 0, and the freezing equilibration solution comprises, per 100 mL in volume, 1.0-5.0 g of a PVA, 7.5-15 mL of a polyalcohol and the balance of a buffer.

According to the present invention, the PVA is selected from one of or a combination of two or more of an isotactic PVA, a syndiotactic PVA and an atactic PVA. For example, the PVA has a syndiotacticity of 15%-60%, preferably 45%-60%, such as 50%-55%.

According to the present invention, the PVA may be selected from a PVA having a molecular weight of 10-500 kDa or higher, such as 10-30 kDa, 30-50 kDa, 80-90 kDa or 200-500 kDa.

According to the present invention, the PVA may be selected from a PVA having a degree of hydrolysis of greater than 80%, such as 80%-99%, 82%-87%, 87%-89%, 89%-99% or 98%-99%.

According to the present invention, the amino acid biomimetic ice growth inhibition material is an amino acid comprising an ice-philic group and a hydrophilic group, or a polymer consisting of an amino acid comprising an ice-philic group and an amino acid comprising a hydrophilic group, wherein the hydrophilic group is a functional group capable of forming a non-covalent interaction with water molecules, and the ice-philic group is a functional group capable of forming a non-covalent interaction with ice.

Preferably, the hydrophilic group is capable of forming a hydrogen bond, a Van der Waals interaction, an electrostatic interaction, a hydrophobic interaction, or a π-π interaction with water, and the ice-philic group is capable of forming a hydrogen bond, a Van der Waals interaction, an electrostatic interaction, a hydrophobic interaction, or a π-π interaction with ice.

Preferably, the hydrophilic group is selected from at least one of hydroxyl (—OH), amino (—NH$_2$), a carboxylic acid group (—COOH), and an amide group (—CONH$_2$).

Preferably, the ice-philic group is selected from at least one of hydroxyl (—OH), amino (—NH$_2$), phenyl (—C$_6$H$_5$), and pyrrolidinyl (—C$_4$H$_8$N).

According to the present invention, the polyamino acid may be a homopolymer (with a degree of polymerization ≥2) of at least one selected from lysine, arginine, proline, threonine, histidine, glutamic acid, aspartic acid, glycine and the like.

According to the present invention, the polypeptide is a compound consisting of two or more amino acids, and can be selected from one or two or more of L-Thr-L-Arg (TR), L-Thr-L-Pro (TP), L-Arg-L-Thr (RT), L-Pro-L-Thr (PT), L-Thr-L-Arg-L-Thr (TRT), L-Thr-L-Pro-L-Thr (TPT), and L-Ala-L-Ala-L-Thr (AAT). These polypeptides can be synthesized using a polypeptide synthesis method known in the art, such as a solid-phase synthesis method.

According to the present invention, the glycopeptide derivative is synthesized by a saccharide and an amino acid, for example is a molecule consisting of gluconolactone (GDL) and an ice-philic amino acid through chemical bonding, and for example is GDL-L-Thr, GDL-L-Gln, GDL-L-Asn, GDL-L-Phe, GDL-L-Tyr, GDL-L-Val, GDL-L-Ser or the like. The glycopeptide compound can be prepared by reacting a saccharide known in the art with an amino acid, for example by a solid-phase synthesis method or by reacting the saccharide with the amino acid in an organic solvent.

According to the present invention, the peptidic compound has a structure of any one of formula (1) to formula (8):

According to the present invention, the compound of formula (I) has a structure shown as any one of the following:

According to the present invention, the compound of formula (9) is prepared by using the following synthetic route:

In the cryopreservation solution and the freezing equilibration solution disclosed herein, the amounts of all the components are based on a total volume of 100 mL, and the balance is a buffer.

The present invention further provides use of the cryopreservation solution in cryopreservation of various cells, organs and tissues, including cryopreservation of oocytes, embryos, various stem cells, organs and tissues, wherein the organs and the tissues include but are not limited to ovarian organs and ovarian tissues.

The present invention further provides a method for freezing and thawing cells or embryos, comprising:
(1) placing the cells or embryos into the cryopreservation solution disclosed herein to prepare a cell suspension, and freezing; and
(2) placing the frozen cells or embryos into a thawing solution for thawing.

According to the method for freezing and thawing disclosed herein, the cells or the embryos are firstly placed into the equilibration solution for equilibration before being placed into the cryopreservation solution.

The present invention further provides a method of cryopreservation of stem cells, in which the microdroplet method is employed. For example, the method of cryopreservation of stem cells comprises the following steps: adding a cryopreservation solution into stem cells, pipetting to disperse the stem cells to prepare a stem cell suspension, and placing the stem cell suspension on a freezing slide and cryopreserving it into liquid nitrogen (−196° C.).

According to an embodiment of the present invention, the thawing of the cryopreserved stem cells comprises placing the freezing slide with the stem cells in an a-MEM medium and thawing the cells at 37° C.

According to an embodiment of the present invention, the stem cells are various stem cells that are known in the art and capable of differentiating, such as totipotent, pluripotent or unipotent stem cells, including but not limited to embryonic stem cells, various types of mesenchymal stem cells (e.g., umbilical cord mesenchymal stem cells, adipose mesenchymal stem cells and bone marrow mesenchymal stem cells), hematopoietic stem cells, and the like.

The present invention further provides a method of cryopreservation of organs and/or tissues, comprising: placing an organ and/or a tissue into a freezing equilibration solution, placing the organ and/or the tissue into a cryopreservation solution, placing the organ and/or the tissue on a freezing slide, and cryopreserving it into liquid nitrogen.

In one embodiment, the organ and/or the tissue is an ovarian tissue or an ovarian organ, which may be a slice of the ovarian tissue or a complete ovarian tissue.

In the present invention, "cryopreservation" and "cryogenic preservation" have the same meaning and are used interchangeably, and refer to preservation of a substance, or a cell, a tissue, or an organ at a low temperature to retain the original physicochemical and/or biological activity, and physiological and biochemical functions thereof.

In the present invention, the type of "stem cells" is not particularly limited. The cryopreservation solution disclosed herein can be used for cryopreservation of various stem cells known in the art, including but not limited to umbilical cord mesenchymal stem cells, bone marrow mesenchymal stem cells, adipose mesenchymal stem cells, hematopoietic stem cells, and the like.

In the present invention, the biological tissue may be derived from animals, including warm-blooded mammals, such as humans and primates; birds; domestic or farm animals, such as cats, dogs, sheep, goats, cattle, horses and pigs; laboratory animals, such as mice, rats and guinea pigs; fish; reptiles; and zoo animals and wild animals, and the like.

Beneficial Effects

The cryopreservation solution provided herein takes the PVA and the amino acid biomimetic ice growth inhibition material as main ice growth inhibition components, features wide source of raw materials and good biocompatibility, avoids the use of serum, is high in safety and can achieve high cell survival rate. The cryopreservation solution disclosed herein has advantages of simple composition, readily available starting materials and low costs, and can be widely applied to cryopreservation of various cells and tissues, such as oocytes, embryos, stem cells, ovarian tissues and ovarian organs, to retain good biological activity.

DETAILED DESCRIPTION

The preparation method of the present invention will be further illustrated in detail with reference to the following specific examples. It should be understood that the following examples are merely exemplary illustration and explanation of the present invention, and should not be construed as limiting the protection scope of the present invention. All techniques implemented based on the aforementioned contents of the present invention are encompassed within the protection scope of the present invention.

Unless otherwise stated, the experimental methods used in the following examples are conventional methods. Unless otherwise stated, the reagents, materials, and the like used in the following examples are commercially available.

In the examples of the present invention, poly-L-proline used in the freezing solution has a degree of polymerization of 15 or 8 and a molecular weight of 1475 or 795, and poly-L-arginine used has a degree of polymerization of 8 and a molecular weight of 1267. Poly-L-proline in a thawing solution has a degree of polymerization of 8 and a molecular weight of 795.

The survival rate in the examples of the present invention is the average survival rate of 3-12 repeated experiments.

Example 1. Cryopreservation of Oocytes and Embryos

1. Preparation of Cryopreservation Solutions: Cryopreservation Solutions were Prepared According to the Following Formulations.

Cryopreservation solution A: 2.0 g of a PVA was dissolved in 30 mL of DPBS in a water bath at 80° C. by heating and magnetic stirring, and the pH was adjusted to 7.0 to give a solution 1; 17 g (0.05 mol) of sucrose (the final concentration of the sucrose in the cryopreservation solution was 0.5 mol $L^{-1}$) was ultrasonically dissolved in 25 mL of DPBS, and after the sucrose was completely dissolved, 10 mL of ethylene glycol was added to give a solution 2; after returning to room temperature, the solution 1 and the solution 2 were mixed homogeneously, the pH was adjusted, and the volume was made up to a total volume of 100 mL to give the cryopreservation solution A for later use.

Cryopreservation solution B (total volume: 100 mL): 1.5 g of poly-L-proline (with a degree of polymerization of 15) was ultrasonically dissolved in 20 mL of DPBS, and the pH was adjusted to 7.0 to give a solution 1; 2.0 g of a PVA was dissolved in 25 mL of DPBS in a water bath at 80° C. by heating and magnetic stirring, and the pH was adjusted to 7.0 to give a solution 2; 17 g (0.05 mol) of sucrose (the final concentration of the sucrose in the cryopreservation solution was 0.5 mol $L^{-1}$) was ultrasonically dissolved in 25 mL of DPBS, and after the sucrose was completely dissolved, 10 mL of ethylene glycol was added to give a solution 3; after returning to room temperature, the solution 1, the solution 2 and the solution 3 were mixed homogeneously, the pH was adjusted, and the volume was made up to a total volume of 100 mL to give the cryopreservation solution B for later use.

Cryopreservation solution C (total volume: 100 mL): 1.5 g of poly-L-arginine (with a degree of polymerization of 8) was ultrasonically dissolved in 20 mL of DPBS, and the pH was adjusted to 7.0 to give a solution 1; 2.0 g of a PVA was dissolved in 25 mL of DPBS in a water bath at 80° C. by heating and magnetic stirring, and the pH was adjusted to 7.0 to give a solution 2; 17 g (0.05 mol) of sucrose (the final concentration of the sucrose in the cryopreservation solution was 0.5 mol $L^{-1}$) was ultrasonically dissolved in 25 mL of DPBS, and after the sucrose was completely dissolved, 10 mL of ethylene glycol was added to give a solution 3; after returning to room temperature, the solution 1, the solution 2 and the solution 3 were mixed homogeneously, the pH was adjusted, and the volume was made up to a total volume of 100 mL to give the cryopreservation solution C for later use.

2. Preparation of Freezing Equilibration Solutions: The Freezing Equilibration Solutions were Prepared According to the Following Formulations.

Freezing equilibration solution a: 7.5 mL of ethylene glycol and 7.5 mL of DMSO were added to 65 mL of DPBS, and mixed well, and 20 mL of serum was added when the freezing equilibration solution was used.

Freezing equilibration solution b: 2.0 g of a PVA was dissolved in 50 mL of DPBS in a water bath at 80° C. by heating and magnetic stirring, the pH was adjusted to 7.0 after the PVA was completely dissolved, 7.5 mL of ethylene glycol was added, all the components were mixed homogeneously, the pH was adjusted, and the volume was made up to 100 mL to give the freezing equilibration solution b for later use.

Comparative Example 1:

A freezing equilibration solution a comprises, per 1 mL, 7.5% (v/v) of DMSO, 7.5% (v/v) of ethylene glycol, 20% (v/v) of fetal bovine serum and the balance of DPBS;

A cryopreservation solution 1# comprises, per 1 mL: 15% (v/v) of DMSO, 15% (v/v) of ethylene glycol, 20% (v/v) of fetal bovine serum, sucrose at 0.5 mol $L^{-1}$, and the balance of DPBS.

A freezing equilibration solution 2# comprises, per 1 mL, 7.5% (v/v) of ethylene glycol, 20% (v/v) of fetal bovine serum and the balance of DPBS;

A cryopreservation solution 2# comprises, per 1 mL, 10% (v/v) of ethylene glycol, 20% (v/v) of fetal bovine serum, sucrose at 0.5 mol $L^{-1}$, and the balance of DPBS.

The three formulations of the thawing solutions used in the Example 1 and Comparative Example 1 were as follows:

A thawing solution 1# comprises a thawing solution I (comprising sucrose at 1.0 mol·$L^{-1}$, 20% of serum and the balance of DPBS), a thawing solution II (comprising sucrose at 0.5 mol·$L^{-1}$, 20% of serum and the balance of DPBS), a thawing solution III (comprising sucrose at 0.25 mol·$L^{-1}$, 20% of serum and the balance of DPBS), and a thawing solution IV (comprising 20% of serum and the balance of DPBS).

A thawing solution 2# comprises a thawing solution I (comprising sucrose at 1.0 mol $L^{-1}$, a PVA at 20 mg $mL^{-1}$, polyproline at 10 mg $mL^{-1}$, and the balance of DPBS), a thawing solution II (comprising sucrose at 0.5 mol $L^{-1}$, a PVA at 20 mg mL$^{-1}$, polyproline at 5.0 mg mL$^{-1}$, and the balance of DPBS), a thawing solution III (comprising sucrose at 0.25 mol L$^{-1}$, a PVA at 20 mg mL$^{-1}$, polyproline at 2.5 mg mL$^{-1}$, and the balance of DPBS), and a thawing solution IV (a PVA at 20 mg mL$^{-1}$ and the balance of DPBS).

A thawing solution 3# comprises a thawing solution I (comprising sucrose at 1.0 mol·L$^{-1}$, a PVA at 20 mg·mL$^{-1}$ and the balance of DPBS), a thawing solution II (comprising sucrose at 0.5 mol·L$^{-1}$, a PVA at 20 mg·mL$^{-1}$ and the balance of DPBS), a thawing solution III (comprising sucrose at 0.25 mol·L$^{-1}$, a PVA at 20 mg mL$^{-1}$ and the balance of DPBS), and a thawing solution IV (comprising a PVA at 20 mg·mL$^{-1}$ and the balance of DPBS).

Application Example 1

The freezing equilibration solutions and the cryopreservation solutions of the example and comparative example described above were used to cryopreserve oocytes and embryos according to the schemes in Table 1 and Table 2, respectively.

1. Cryopreservation of Oocytes

Mouse oocytes were firstly equilibrated in a freezing equilibration solution for 5 min, and then equilibrated in the prepared cryopreservation solution for 1 m. The oocytes equilibrated in the cryopreservation solution were loaded onto straws, and the straws were quickly put into liquid nitrogen (−96° C.) and then closed for cryopreservation. At the time of thawing, the frozen oocytes were equilibrated in the thawing solution I at 37 #C for 5 mi, and then equilibrated in the thawing solutions II-IV in sequence for 3 m each. After the thawed oocytes were incubated for 2 h, the number of the survived cells was observed, and the survival rates were calculated (see Table 1).

2. Cryopreservation of Embryos

Mouse embryos were firstly equilibrated in a freezing equilibration solution for 5 m, and then equilibrated in the cryopreservation solution prepared according to the above formulation for 50 s. The embryos equilibrated in the cryopreservation solution were loaded onto straws, and the straws were quickly put into liquid nitrogen (−196° C.) and closed for cryopreservation. At the time of thawing, the frozen embryos were equilibrated in the thawing solution I at 37° C. for 3 m, and then equilibrated in the thawing solutions II-IV in sequence for 3 m each. After the thawed embryos were incubated for 2 h, the number of survived embryos was observed, and the survival rates were calculated (see Table 2).

TABLE 1

Survival rates of cryopreserved mouse oocytes

| No. | Equilibration solution | Cryopreservation solution | Thawing solution | Total number of frozen oocytes | Survival rates after 2 h |
|---|---|---|---|---|---|
| Application Embodiment 1 | b | A | Thawing solution 1# | 50 | 93.4% |
| Application Embodiment 2 | b | A | Thawing solution 3# | 53 | 96.5% |
| Application Embodiment 3 | b | B | Thawing solution 1# | 39 | 89.7% |
| Application Embodiment 4 | b | B | Thawing solution 2# | 60 | 98.6% |
| Comparative Embodiment 1 | a | Freezing solution 1# | Thawing solution 1# | 146 | 95.0% |
| Comparative Embodiment 2 | Equilibration solution 2# | Freezing solution 2# | Thawing solution 1# | 96 | 81.9% |

TABLE 2

Survival rates of cryopreserved mouse embryos

| No. | Equilibration solution | Cryopreservation solution | Thawing solution | Total number of frozen embryos | Survival rates after 2 h |
|---|---|---|---|---|---|
| Application Embodiment 5 | b | B | Thawing solution 1# | 42 | 95.2% |
| Application Embodiment 6 | b | C | Thawing solution 3# | 30 | 96.67% |
| Application Embodiment 7 | b | A | Thawing solution 1# | 41 | 95.8% |
| Comparative Embodiment 3 | a | Freezing solution 1# | Thawing solution 1# | 38 | 94.30% |
| Comparative Embodiment 4 | Equilibration solution 2# | Freezing solution 2# | Thawing solution 1# | 39 | 82.40% |

As can be seen from the data in Table 1 and Table 2, when the cryopreservation solution disclosed herein is used for cryopreservation of oocytes and embryos, the survival rates of the embryos and the oocytes can reach more than 95%, and the survival rate of the oocytes can reach 96.5% and 98.6%, which are far higher than the post-thaw survival rate of the oocytes cryopreserved by a serum-containing commercial cryopreservation solution (Comparative Embodiments 1-4) generally used in clinic practice at present. When the equilibration solution, the freezing solution and the thawing solution all are free of serum and DMSO, the survival rates of cryopreserved oocytes and embryos can be superior to those of an existing commercial cryopreservation solution under the combined action of the biomimetic ice growth inhibition material disclosed herein, a permeable protectant, namely ethylene glycol, and the like. The problems are further solved that the commercial cryopreservation solutions commonly used in clinical practice at present are short in shelf life and prone to introduce parasitic biological contaminants due to the presence of serum.

Example 2. Cryopreservation of Human Umbilical Cord Mesenchymal Stem Cells

1. Preparation of Cryopreservation Solutions:
Cryopreservation solution A: 2.0 g of a PVA was dissolved in 30 mL of DPBS in a water bath at 80° C. by heating and magnetic stirring, and the pH was adjusted to 7.0 to give a solution 1; 17 g (0.05 mol) of sucrose (the final concentration of the sucrose in the cryopreservation solution was 0.5 mol L$^{-1}$) was ultrasonically dissolved in 25 mL of DPBS, and after the sucrose was completely dissolved, 10 mL of ethylene glycol was added to give a solution 2; after returning to room temperature, the solution 1 and the solution 2 were mixed homogeneously, the pH was adjusted, and the volume was made up to a total volume of 100 mL to give the cryopreservation solution A for later use.
2. Comparative Example 2:
A cryopreservation solution 1# comprises, per 1 mL: 15% (v/v) of DMSO, 15% (v/v) of ethylene glycol, 20% (v/v) of fetal bovine serum, sucrose at 0.5 mol L$^{-1}$, and the balance of DPBS.
A cryopreservation solution 3# comprises, per 1 mL, 10% (v/v) of DMSO, 15% (v/v) of fetal bovine serum, and the balance of a-MEM medium (C12571500BT, Invitrogen, USA).

Application Example 2

Human umbilical cord mesenchymal stem cells were cryopreserved using the cryopreservation solutions of Example 2 and Comparative Example 2.
1. Cryopreservation of Human Umbilical Cord Mesenchymal Stem Cells by Microdroplet Method
The cryopreservation method of the human umbilical cord stem cells used herein is specifically as follows: human umbilical cord mesenchymal stem cells on a culture dish were digested using 25% pancreatin for 3 min (the digestion time was controlled to be within 2-3 min), put into a culture solution (10% FBS+a-MEM culture medium) of the same volume, and gently pipetted until the stem cells completely fell off; the cells were added into a 1.5 mL centrifuge tube for centrifuging for 5 min at 1000 rpm, and the supernatant was discarded (to separate the cells from the supernatant); 10 μL of freezing solution was added to the bottom of the centrifuge tube, the stem cells were gently pipetted to disperse stem cell clusters, and 10 μL of freezing solution with the stem cells was placed on a freezing slide and then cryopreserved in liquid nitrogen (−196° C.). At the time of thawing, the straw with the cells and the freezing solution was placed directly in a culture medium at 37° C. for thawing. After thawing, cells were stained with trypan blue to observe the survival rates, and the number of cells was counted using an instrument JIMBIO-FIL, survival rate=number of live cells/total number of cells (see Table 3).

TABLE 3

Survival rates of cryopreserved human umbilical cord mesenchymal stem cells

| No. | Cryopreservation solution | Cryopreservation method | Survival rates |
| --- | --- | --- | --- |
| Application Embodiment 8 | A | Microdroplet method | 77.1% |
| Comparative Embodiment 5 | Freezing solution 1# | Microdroplet method | 63.9% |
| Comparative Embodiment 6 | Freezing solution 3# | Microdroplet method | 76.6% |

When the cryopreservation solution disclosed herein is used for cryopreservation of the human umbilical cord mesenchymal stem cells, the survival rate of the stem cells can reach 77% or more although no serum is used. This means that the cryopreservation reagent can achieve the same effectiveness as a conventional freezing solution in freezing stem cells, and has a post-thaw survival rate even far higher than that of a cryopreservation solution (Comparative Embodiment 6) comprising 10% of DMSO and 20% of serum commonly used at present.

Example 3: Cryopreservation of Ovarian Organs and Ovarian Tissues

1. Preparation of Cryopreservation Solutions:
Preparation of the cryopreservation solution: the cryopreservation solution and the freezing equilibration solution were prepared in the same manner as in Example 1 according to the formulations of the cryopreservation solution A and the freezing equilibration solution b of Example 1.
2. Comparative Example 3:
A freezing equilibration solution a comprises, per 1 mL, 7.5% (v/v) of DMSO, 7.5% (v/v) of ethylene glycol, 20% (v/v) of fetal bovine serum and the balance of DPBS;
A cryopreservation solution 1# comprises, per 1 mL: 15% (v/v) of DMSO, 15% (v/v) of ethylene glycol, 20% (v/v) of fetal bovine serum, sucrose at 0.5 mol L$^{-1}$, and the balance of DPBS.
3. Thawing Solution:
The thawing solution was prepared according to the formulations of the thawing solution 1# and the thawing solution 3# of Example 1:
A thawing solution 1# comprises a thawing solution I (comprising sucrose at 1.0 mol·L$^{-1}$, 20% of serum and the balance of DPBS), a thawing solution II (comprising sucrose at 0.5 mol·L$^{-1}$, 20% of serum and the balance of DPBS), a thawing solution III (comprising sucrose at 0.25 mol·L$^{-1}$, 20% of serum and the balance of DPBS), and a thawing solution IV (comprising 20% of serum and the balance of DPBS).
A thawing solution 3# comprises a thawing solution I (comprising sucrose at 1.0 mol·L$^{-1}$, a PVA at 20 mg·mL$^{-1}$ and the balance of DPBS), a thawing solution II (comprising sucrose at 0.5 mol·L$^{-1}$, a PVA at 20 mg·mL$^{-1}$ and the balance of DPBS), a thawing solution Ill (comprising sucrose at 0.25 mol·L⁻¹, a PVA at 20 mg·mL⁻¹ and the balance of DPBS), and a thawing solution IV (comprising a PVA at 20 mg·mL⁻¹ and the balance of DPBS).

Application Example 3:

The ovarian organs of mice newly born within 3 days and the ovarian tissue slices of sexually mature mice were cryopreserved using the freezing equilibration solutions and cryopreservation solutions of the above examples and comparative examples according to the schemes in Table 4 and Table 5.

Figure 1:
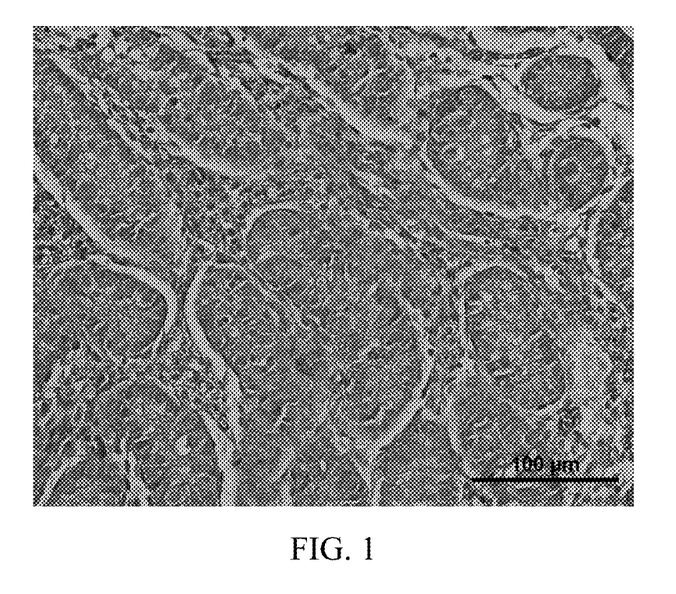
FIG. 1 is a picture of a stained slice of a fresh (unfrozen) ovarian organ.

The whole ovarian organs or ovarian tissue slices were firstly equilibrated in an equilibration solution at room temperature for 25 min, then equilibrated in the prepared cryopreservation solution for 15 min, and then loaded onto straws, the straws were put into liquid nitrogen for preservation. After thawing, the ovarian organs or ovarian tissue slices were incubated in a culture solution (10% FBS+a-MEM) in an incubator at 37° C./5% CO$_2$ for 2 h for further thawing, and then fixed with 4% paraformaldehyde, embedded in paraffin and stained with HE for morphological observation with microscope. The results are shown in FIGS. 1-6. FIG. 1 is a picture of a stained slice of a fresh unfrozen ovarian organ, and FIG. 4 is a picture of a stained slice of a fresh unfrozen ovarian tissue.

TABLE 4

Ovarian organ cryopreservation scheme

Figure 2:
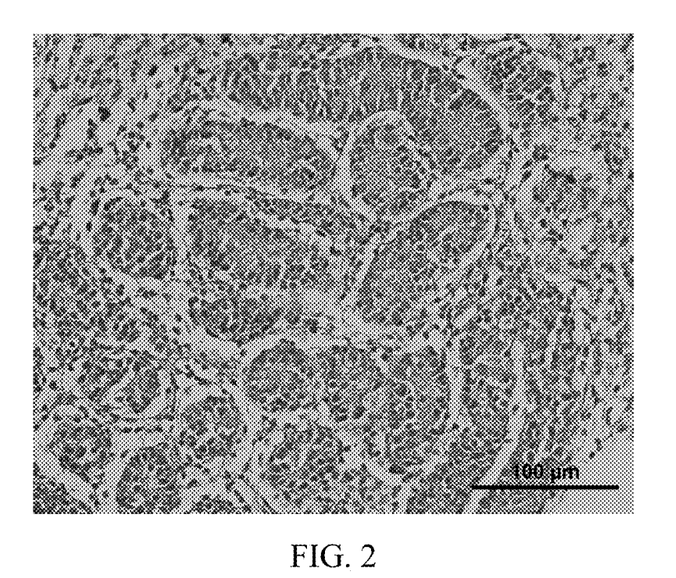
FIG. 2 is a picture of a stained slice of a cryopreserved intact ovarian organ of Comparative Embodiment 7 after thawing.
Figure 3:
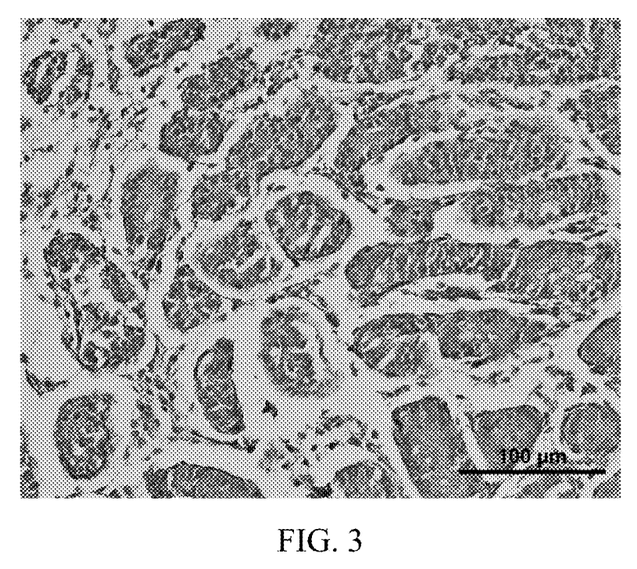
FIG. 3 is a picture of a stained slice of a cryopreserved intact ovarian organ of Application Embodiment 9 after thawing.
Figure 4:
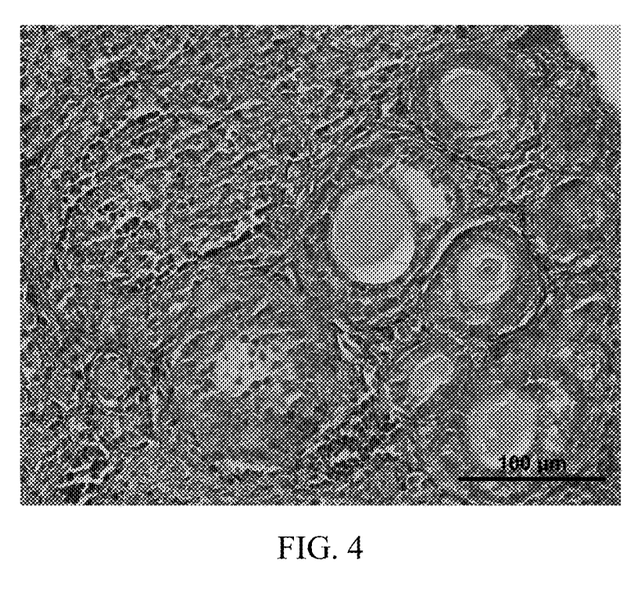
FIG. 4 is a picture of a stained slice of fresh (unfrozen) ovarian tissue.

| No. | Equilibration solution | Cryopreservation solution | Thawing solution | Morphology |
|---|---|---|---|---|
| Application Embodiment 9 | b | A | Thawing solution 3# | FIG. 3 |
| Comparative Embodiment 7 | a | Freezing solution 1# | Thawing solution 1# | FIG. 2 |

TABLE 5

Ovarian tissue cryopreservation scheme

Figure 5:
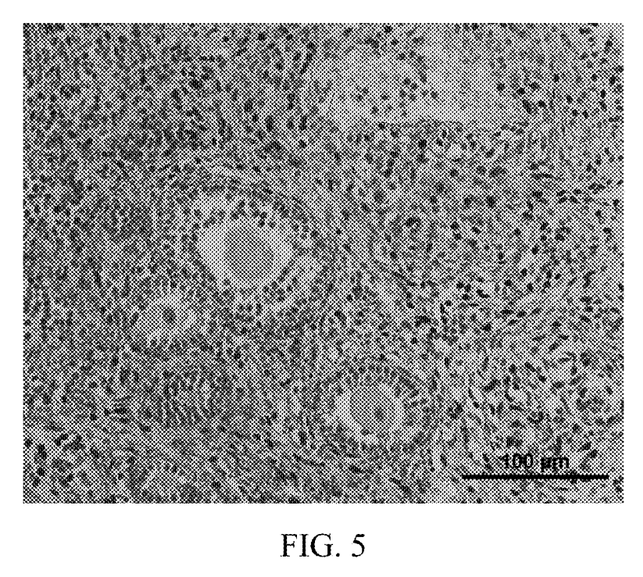
FIG. 5 is a picture of a stained slice of cryopreserved ovarian tissue of Comparative Embodiment 8 after thawing.
Figure 6:
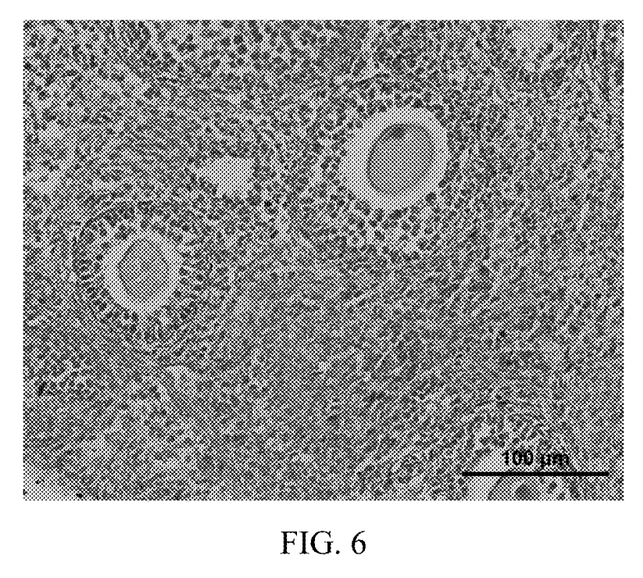
FIG. 6 is a picture of a stained slice of cryopreserved ovarian tissue of Application Embodiment 10 after thawing.

| No. | Equilibration solution | Cryopreservation solution | Thawing solution | Morphology |
|---|---|---|---|---|
| Application Embodiment 10 | b | A | Thawing solution 3# | FIG. 6 |
| Comparative Embodiment 8 | a | Freezing solution 1# | Thawing solution 1# | FIG. 5 |

As can be seen from FIGS. 1-6, when the cryopreservation solution disclosed herein is used to preserve ovarian organs and ovarian tissues, compared with the cryopreservation solution commonly used in the prior art and fresh unfrozen ovarian organs, the ovarian organs and ovarian tissues treated with the cryopreservation solution described herein are characterized in that: the original follicle structure is relatively intact, the interstitial structure is relatively intact, the cytoplasm of cells is homogeneous and lightly stained in a relatively large amount, and nucleus shrinkage and deep staining are relatively mild, the structure of the vascular wall of the ovarian organ is intact, lumen collapse is mild, the cytoplasm of endothelial cells is homogeneous and lightly stained in a relatively large amount, and nucleus shrinkage and deep staining are relatively mild.

It can be seen that cryopreservation solutions disclosed herein prepared with various biomimetic ice growth inhibition materials as main components have good inhibiting effect on the growth of ice crystals, can avoid the use of serum and maintain good biocompatibility, and can be applied to cryopreservation of oocytes, embryos, stem cells, reproductive organs and tissues, where high cell survival rates and good biological activity can be achieved.

The examples of the present invention have been described above. However, the present invention is not limited to the above examples. Any modifications, equivalents, improvement and the like made without departing from the spirit and principle of the present invention shall fall within the protection scope of the present invention.

The invention claimed is:

1. A serum-free cryopreservation solution comprising, per 100 mL in volume, 0.01-50.0 g of a biomimetic ice growth inhibition material, 5.0-45 mL of a polyalcohol, a water-soluble saccharide at 0.1-1.0 mol L⁻¹, 0-15 mL of DMSO and the balance of a buffer, wherein the biomimetic ice growth inhibition material is a combination of an atactic polyvinyl alcohol (PVA) having a syndiotacticity of 15%-60% and a degree of hydrolysis of greater than 80% with an amino acid biomimetic ice growth inhibition material selected from GDL-L-Thr, GDL-L-Gln, GDL-L-Asn, GDL-L-Phe, GDL-L-Tyr, GDL-L-Val, or GDL-L-Ser, and wherein the polyalcohol differs from the atactic PVA.

2. The cryopreservation solution according to claim 1, wherein:
the polyalcohol is a polyalcohol with 2-5 carbon atoms;
the water-soluble saccharide is selected from a non-reducing disaccharide, a water-soluble polysaccharide, a glycoside, and mixtures thereof; and
the buffer is selected from DPBS, hepes-buffered HTF buffer, cell buffers, and mixtures thereof.

3. The cryopreservation solution according to claim 1, wherein:
the content of DMSO is 1.0-10 mL per 100 mL of the cryopreservation solution;
the content of the water-soluble saccharide is 0.1-0.8 mol L⁻¹ per 100 mL of the cryopreservation solution; and
the content of the polyalcohol is 5.0-45 mL per 100 mL of the cryopreservation solution.

4. The cryopreservation solution according to claim 1, comprising, per 100 mL in volume, 0.1-50 g of the amino acid biomimetic ice growth inhibition material, 5.0-45 mL of the polyalcohol, 0-15 mL of DMSO, the water-soluble saccharide at 0.1-1 mol $L^{-1}$, and the balance of the buffer.

5. The cryopreservation solution according to claim 1, comprising, per 100 mL in volume, 0.01-6.0 g of the atactic PVA, 5.0-45 mL of the polyalcohol, the water-soluble saccharide at 0.1-1.0 mol $L^{-1}$, 0-15 mL of DMSO, and the balance of the buffer.

6. A preparation method of the cryopreservation solution according to claim 1, comprising the following steps:
   (1) dissolving the amino acid biomimetic ice growth inhibition material in a portion of the buffer, and adjusting the pH to form a solution 1; optionally, dissolving the atactic PVA in another portion of the buffer, and adjusting the pH to give a solution 2;
   (2) dissolving the sucrose in a third portion of the buffer, and adding other components after the sucrose is completely dissolved to prepare a solution 3; and
   (3) mixing the solution 1, optionally the solution 2 and the solution 3 after they are cooled to room temperature, and adjusting the pH and making up to a predetermined volume with the buffer to give the cryopreservation solution.

7. An amino acid cryopreservation reagent, comprising the cryopreservation solution according to claim 1 and a freezing equilibrium solution, wherein the freezing equilibrium solution comprises, per 100 mL in volume, 5.0-45 mL of the polyalcohol, the balance of the buffer, and optionally, 0-15 mL of DMSO, and 0.1-5.0 g of the atactic PVA having a syndiotacticity of 15%-60% and a degree of hydrolysis of greater than 80%, wherein the polyalcohol differs from the atactic PVA, wherein the freezing equilibrium solution and the preservation solution are present independently of each other.

8. A process for cryopreservation of a biological tissue, comprising placing the biological tissue in the cryopreservation solution according to claim 1 to prepare a cell suspension, and freezing the cell suspension.

9. The process according to claim 8, wherein the biological tissue is selected from an oocyte, an embryo, a stem cell, an organ, tissue, and mixtures thereof.

10. The cryopreservation solution according to claim 2, wherein:
   the polyalcohol is selected from ethylene glycol, propylene glycol, and glycerol; or
   the water-soluble saccharide is selected from sucrose and trehalose.

11. The cryopreservation solution according to claim 1, wherein:
   the polyalcohol is selected from ethylene glycol, propylene glycol, and glycerol; or
   the water-soluble saccharide is selected from sucrose, trehalose, water-soluble cellulose, polysucrose, and mixtures thereof.

* * * * *